(12) United States Patent
Wang et al.

(10) Patent No.: US 7,053,139 B2
(45) Date of Patent: May 30, 2006

(54) INHIBITING POLYMER OXIDATION USING NON-PHENOLIC ANTIOXIDANTS

(76) Inventors: Qi Wang, 421 Pathfinder Dr., Birdsboro, PA (US) 19508; Sandor Nagy, 561 Stanhope Ct., Naperville, IL (US) 60565

( * ) Notice: Subject to any disclaimer, the term of this patent is extended or adjusted under 35 U.S.C. 154(b) by 548 days.

(21) Appl. No.: 10/065,636

(22) Filed: Nov. 5, 2002

(65) Prior Publication Data

US 2003/0083405 A1 May 1, 2003

Related U.S. Application Data

(63) Continuation-in-part of application No. 09/223,710, filed on Dec. 30, 1998, now abandoned.

(51) Int. Cl.
*C08K 13/00* (2006.01)
*C08K 5/04* (2006.01)

(52) U.S. Cl. ..................................... 524/111
(58) Field of Classification Search ................. 524/111
See application file for complete search history.

(56) References Cited

U.S. PATENT DOCUMENTS 1,941,474 A * 1/1934 Jaeger ........................ 524/111
4,082,716 A * 4/1978 Fielding et al. ............. 524/111

OTHER PUBLICATIONS

Peter Sorera, New trends in Polymer Stabilization, Journal of Vinyl & Additive Technology, Sep. 1998, vol. 4, No. 3.*

* cited by examiner

Primary Examiner—Kelechi C. Egwim
(74) Attorney, Agent, or Firm—Richard D. Fuerle

(57) ABSTRACT

The oxidation of a polymer is inhibited by adding to the polymer about 0.005 to about 10 phr of an antioxidant having (in non-polymeric form) the general formula

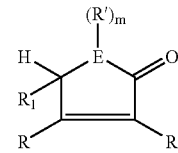

The polymer can be poly(vinylchloride), a polycarbonate, a polyether, polyethylene, polypropylene, or a mixture thereof when the antioxidant is not phthalide and can be poly (vinylchloride), a polycarbonate, a polyether, or a mixture thereof when the antioxidant is phthalide. In the formula, E is O, S, or N, $R_1$ is H, R', OR', SR', OP(R')$_2$, COR', each R is independently selected from $R_1$, alkylenyl from $C_1$ to $C_{12}$, aminoalkyl from $C_1$ to $C_{12}$, and hydroxyalkyl from $C_1$ to $C_{12}$, R' is alkyl from $C_1$ to $C_{12}$ or aryl, alkylaryl, or aralkyl from $C_6$ to $C_{12}$, R" is G, GO, GS, GNH, NHG, NHGO, NHGNH, NHGS, OG, OGO, OGNH, OGS, SGO, SGNH, or SGS, G is aklkylenyl from $C_1$ to $C_{12}$, arylenyl from $C_6$ to $C_{12}$, alkylarylenyl from $C_7$ to $C_{12}$, or arylalkylenyl from $C_7$ to $C_{12}$, m is 0 if E is O or S and is 1 if E is N, and two R groups can join from an alicyclic ring or an aromatic ring or an R group and an $R_1$ group can join to form an alicyclic ring.

11 Claims, No Drawings

INHIBITING POLYMER OXIDATION USING NON-PHENOLIC ANTIOXIDANTS

CROSS REFERENCE TO RELATED APPLICATIONS

This application is a continuation-in-part of application Ser. No. 09/223,710, filed Dec. 30, 1998, now abandoned.

BACKGROUND OF THE INVENTION

This invention relates to inhibiting the oxidation of polymers. In particular, it relates to the use of certain non-phenolic antioxidants for that purpose.

Phenolic compounds are one of the most important classes of antioxidants used in formulating polymers, especially poly(vinylchloride) (PVC). Typical examples of such compounds include butylated hydroxytoluene (BHT), bisphenol A, and pentaerythritol tetrakis(3,5-di-ter-butyl-4-hydroxyhydrocinnamate). However, these materials can adversely affect certain polymer properties in specific applications, such as the color stability of radiation-sterilized articles.

U.S. Pat. No. 4,082,716 adds phthalide to polypropylene to improve impact and flow properties, but it discolored the polymer, which was undesirable. U.S. Pat. No. 1,941,474 adds phthalide to polyesters as plasticizers. Phthalide is 1(3H)-isobenzofuranone (9CI). It is also known as phthalide (6CI, 8CI); 1-phthalanone; 2-hydroxymethylbenzoic acid y-lactone; and phthalolactone. It has the registry number 87-41-2 and the formula

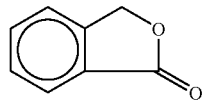

An article by Peter Solera titled, "New Trends in Polymer Stabilization," in the Journal of Vinyl & Additive Technology, September, 1998, Vol. 4, No. 3, pages 198 to 210, discloses the use of a benzofuranone stabilizer (FIG. 6) referred to as "L1." That stabilizer has the formula

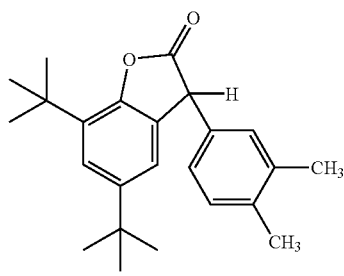

and the chemical name 5,7-di-t-butyl-3-(3,4-di-methylphenyl)-3H-benzofuran-2-one.

SUMMARY OF THE INVENTION

We have found a new family of non-phenolic antioxidants which inhibit the oxidation of polymers. When these antioxidants are placed in a polymer, degradation is reduced. After exposure to gamma radiation, less yellowing of the polymer, which indicates oxidation and degradation, is observed when these antioxidants are present. The antioxidants of this invention are effective when used in a variety of different polymers.

DETAILED DESCRIPTION

The antioxidants of this invention have the general formula

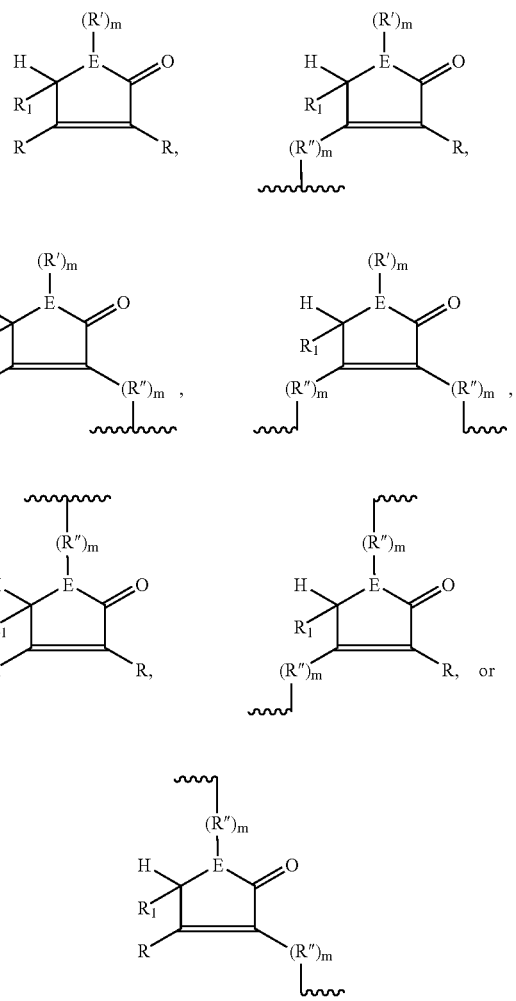

where E is O, S, or N, $R_1$ is H, R', OR', SR', OP(R')$_2$, or COR', each R is independently selected from $R_1$, alkylenyl from $C_1$ to $C_{12}$, aminoalkyl from $C_1$ to $C_{12}$, and hydroxyalkyl from $C_1$ to $C_{12}$, R is alkyl from $C_1$ to $C_{12}$ or aryl, alkylaryl, or aralkyl from $C_6$ to $C_{12}$, R" is G, GO, GS, GNH, NHG, NHGO, NHGNH, NHGS, OG, OGO, OGNH, OGS, SGO, SGNH, or SGS, where G is alkylenyl from $C_1$ to $C_{12}$, arylenyl from $C_6$ to $C_{12}$, alkylarylenyl from $C_7$ to $C_{12}$, and arylalkylenyl from $C_7$ to $C_{12}$, and m is 0 if E is O or S and is 1 if E is N.

Two R groups can join to form an alicyclic ring or an aromatic ring or an R group and an $R_1$ group can join to form an alicyclic ring. Preferably, E is O, R is OR', $R_1$ is H when E is N, R' is alkyl from $C_1$ to $C_{12}$, and R" is G as those antioxidants are more efficient. The word "aromatic" is intended to mean a ring of six carbon atoms joined together by three unsaturated bonds that resonate with three single bonds.

As shown in the second to the seventh above general formulas, the antioxidants can also be used in a polymeric form, thereby rendering them less extractable. The polymeric form can be made using standard chemistry by means of, for example, an alkylenyl, aminoalkyl, or hydroxyalkyl R group. The backbone of these polymeric materials can have the structures of polyolefins, polystyrene, polyethers, polyesters, polysiloxanes, polyamines, polyamides, polyimides, polycarbonates, or other polymers. For example, when one of the R groups is alkylenyl with a carbon-carbon double bond at the end, the antioxidants can be polymerized using either radical initiators or transitional metal catalysts. When one of the R groups is aminoalkyl or hydroxyalkyl, the antioxidants can react with materials such as acrylic chlorides to become reactive monomers, which can be polymerized using conventional methods. If both of the R groups are aminoalkyl or hydroxyalkyl groups, the antioxidants can undergo a condensation polymerization with di-carboxylic acids, chlorides, or anhydrides, or with phosgene, to form polyesters, polyamides, polyimides, and polycarbonates. If both of the R groups are hydroxyalkyl groups, the antioxidants can react with silicon chlorides to form polysiloxanes. If both of the R groups are aminoalkyl groups, the antioxidants can react with bis-aldehydes in the presence of hydride to form polyamines. Alternatively, instead of the above-described polymerization approach, the polymeric form of the antioxidants can be prepared by reacting the monomeric antioxidants with functionalized polymers such as poly(vinylbenzyl chloride), thereby attaching the antioxidants to a polymeric backbone, such as polystyrene. These approaches are well known to these skilled in polymer chemistry. For general references to the above cited reactions, see Functional Monomers, edited by R. H. Yocum and E. B. Nyquist, volumes 1 & 2, Marcel Dekker (1973); Vinyl and Diene Monomers, edited by E. C. Leonard, Wiley-Interscience, (1971); Polymer Syntheses, by S. R. Sandler and W. Karo, Academic Press, 1974; and Styrene, Its Polymers, Copolymers, and Derivatives, edited by R. H. Boundy, R. F. Boyer Reinhold Publishing Corp. (1952).

Examples of antioxidants within the scope of the general formula include:

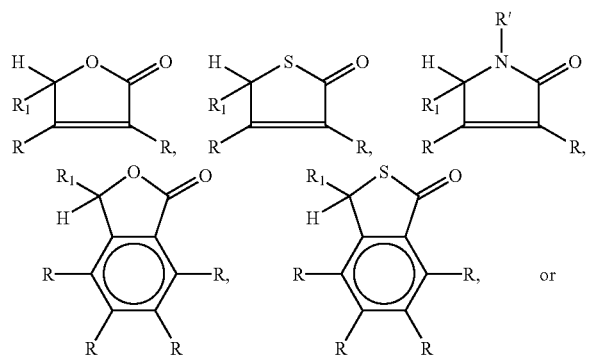

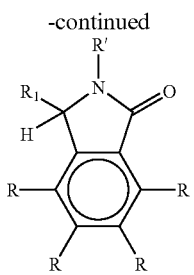

Within those examples, the most preferred antioxidants are:

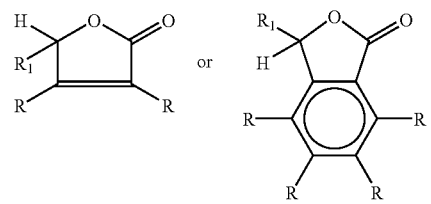

When E is O, the claimed compounds belong to either the family of 2(5H)-furanones or to the family of its aromatic derivatives, 1(3H)-isobenzofuranones, i.e., derivatives of phthalide. Many of these compounds, such as 2(5H)-furanone; 3-methyl- 2(5H)-furanone, 4-methoxy-2(5H)-furanone, and phthalide, can be purchased from commercial sources such as the Sigma-Aldrich Company. The remaining compounds can be easily made by a skilled synthetic organic chemist by making derivatives of commercially available 2(5H)-furanone, phthalide, or another starting material using well-known organic reactions. For example, see J. H. Gardner et al., Organic Synthesis, collective volume II, pages 526–527, John Wiley & Sons (1943); Camille A. Boulet et al., Heterocycles, 28(1), 405–10 (1989), cited in Chemical Abstracts, 111, 194487t (1989); and Japanese Patent 63,267, 71 7, cited in Chemical Abstracts, 111, 120875w (1 989). When E is S, the claimed compounds belong to either the family of 2(5H)-thiophenones or to the family of benzo[c] thiophen-1(3H)-one or 2-thiophthalide. The parent 2(5H)-thiophenone can be purchased from commercial sources such as the Sigma-Aldrich Company. Compounds in these families can also be easily made by a skilled synthetic organic chemist by making a derivative of the commercially available 2(5H)-thiophenone or another starting material using organic reactions well-known to an organic chemist. For example, see Haruhito Oishi et al., PCT Int. Appl. WO 88 04,652, cited in Chemical Abstracts, 110, 95006h (1989); Rene Kiesewetter et al., Helv. Chim. Acta 72(1), 83–92 (1989); Chemical Abstracts, 111, 194490p (1989); and Iwona Polec et al., European J. Org. Chem, 1033–1036 (2002), cited in Chemical Abstracts, 137, 125057 (2002).

When E is N, the claimed compounds belong to either the family of 3-pyrrolin-2-one or to the family of isoindol-1-one. The compounds in these families can also be easily made by a skilled synthetic organic chemist from commercially available starting materials using organic reactions well-known to an organic chemist. For example, see Nobuhiro Nagashima et al., Japanese Patent 01,143, 853, cited in Chemical Abstracts 111, 232567d (1989); Haruhito Oishi et. al., PCT Int. Appl. WO 88 04,652, cited in Chemical Abstracts, 110, 95006h (1989); and Ryu Sato et al., Bull.

Chem. Soc. Jpn. 61(7), 2481–5 (1988), cited in Chemical Abstracts 110, 94916t (1989).

The antioxidants can be used to inhibit the degradation of a variety of oxidizable polymers. Except when the antioxidant is the compound phthalide (registry number 87-41-2), they can be used to inhibit the oxidation of PVC, polycarbonates, polyethers, polyethylene, polypropylene, and mixtures thereof and, when the antioxidant is phthalide, they can be used to inhibit the oxidation of PVC, polycarbonates, polyethers, and mixtures thereof. They are especially effective with PVC, polyethylene, polypropylene, polycarbonates, and mixtures thereof.

The antioxidants can be added to a polymer in a variety of ways, such as mixing with the reactants at the beginning of polymerization or during various stages of the reaction, but it is preferably added after monomer conversion has reached at least 70%. The antioxidant can also be added during the drying of the polymer or during compounding. Various methods can used for compounding, including milling, dry mixing, and extrusion. About 0.005 to about 10 phr (parts by weight per hundred parts by weight of polymer) can be used. Less antioxidant is ineffective and more has a diminishing effect. Preferably, about 0.2 to about 5 phr of antioxidant is used. In addition to the antioxidant, other chemicals, such as other anti-yellowing additives, plasticizers, Ca/Zn heat stabilizers, and epoxidized soybean oil, can also be added to the polymer, as is known in the art.

The following examples further illustrate this invention.

EXAMPLES 1 TO 14

To a mixture of 150.00 g PVC, sold by Occidental Chemical Corp. as "Oxy 240," 0.30 g stearic acid, 0.23 g of a heat stabilizer, sold by Witco as "Mark 152 S," 97.50 g dioctyl phthalate (DOP), and 15.00 g epoxidized soybean oil, sold by Witco as "Drapex 6.8," was added various amounts of different antioxidants. The mixture was thoroughly blended and hot milled at 149 E C (300 E F) for 5 minutes. The resulting PVC sheet was cut and pressed into a 10×7.6×0.6 cm (4×3×¼ inches) plaque at 166 E C (330 E F). The plaque was divided into two smaller pieces, one for y radiation and the other for comparison. After being subjected to γ radiation at a dose of 50 kGy, the irradiated plaque was again divided into two pieces, one of which was oven aged at 50 E C for 48 hours. The yellowness index (YI) of the plaques obtained was measured as described by the Hunter equations (see "The Measurement of Appearance" by Richard S. Hunter, John Wiley & Sons, New York, 1975) using a Macbeth 2020 Plus Color Eye Spectrometer. The following table gives the antioxidants used and the results:

| Example | Antioxidant (g) | Initial | Yellowness After radiation | After aging |
|---|---|---|---|---|
| 1 | 3-methyl-2(5H)furanone (0.36) | 10.9 | 36.6 | 59.1 |
| Control | — | 12.4 | 45.0 | 72.0 |
| 2 | 2(5H)furanone (0.42) | 11.9 | 36.7 | 61.0 |
| Control | — | 12.4 | 45.0 | 72.0 |
| 3 | 4-methoxy-2(5H) furanone (0.23) | 11.5 | 31.4 | 60.3 |
| Control | — | 12.4 | 45.0 | 72.0 |
| 4 | phthalide (0.31) | 12.3 | 36.5 | 63.6 |
| Control | — | 12.4 | 45.0 | 72.0 |
| 5 | HP-136 (0.10) | 15.3 | 61.7 | 82.1 |

-continued

| Example | Antioxidant (g) | Initial | Yellowness After radiation | After aging |
|---|---|---|---|---|
| 6 | HP-136 (0.20) | 14.8 | 63.7 | 86.2 |
| 7 | HP-136 (0.30) | 15.5 | 64.8 | 85.3 |
| 8 | HP-136 (0.40) | 16.0 | 68.4 | 85.9 |
| 9 | HP-136 (0.50) | 15.2 | 68.5 | 84.9 |
| 10 | HP-136 (0.60) | 14.8 | 66.9 | 89.0 |
| 11 | HP-136 (0.90) | 14.8 | 70.0 | 84.3 |
| 12 | HP-136 (1.20) | 18.0 | 72.0 | 84.4 |
| 13 | HP-136 (1.50) | 15.8 | 72.1 | 83.1 |
| 14 | HP-136 (1.81) | 15.4 | 70.9 | 83.5 |
| Control for Examples 5–14 | | 19.1 | 53.7 | 79.0 |

In the above table, Examples 5C to 14C are comparative. The antioxidant used in those examples, "HP 136," was purchased from Ciba and is the compound referred to in the above-cited article by Peter Solera as "L1." The above results show that the antioxidants of this invention were effective in reducing the yellowness of PVC after exposure to gamma radiation while "HP 136" was not.

The invention claimed is:

1. A method of inhibiting the oxidation of a polymer comprising adding to a polymer selected from the group consisting of poly(vinylchloride), polycarbonates, polyethers, and mixtures thereof, about 0.005 to about 10 phr of an antioxidant having the general formula

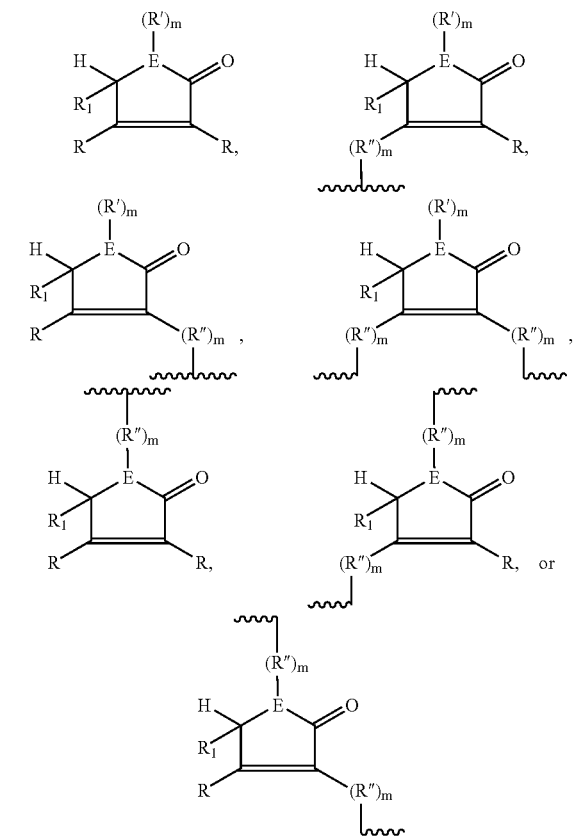

where each R is independently selected from H or OR'; R' is alkyl from $C_1$ to $C_{12}$; $R_1$ is H; R" is alkylenyl from $C_1$ to $C_{12}$, arylenyl from $C_6$ to $C_{12}$, alkylarylenyl from $C_7$ to $C_{12}$, or arylalkylenyl from $C_7$ to $C_{12}$; E is O, and m is 0.

2. A method according to claim 1 wherein said polymer is selected from the group consisting of poly(vinylchloride), polycarbonates, and mixtures thereof.

3. A method according to claim 1 wherein R is H.

4. A method according to claim 1 wherein said antioxidant has the general formula

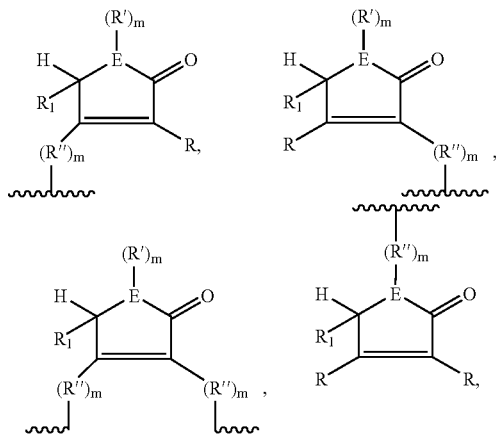

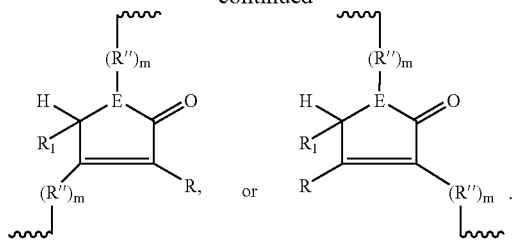

5. A method according to claim 1 wherein R is OR'.

6. A method according to claim 1 wherein two R groups join to form an aromatic ring.

7. A method according to claim 1 wherein said antioxidant is added during the polymerization of said polymer.

8. A method according to claim 1 wherein said antioxidant is added during compounding said polymer.

9. A method according to claim 1 wherein said polymer is poly(vinylchloride).

10. A method according to claim 1 wherein wherein said polymer is a polycarbonates.

11. A method according to claim 1 wherein said polymer is a polyether.

\* \* \* \* \*